INVENTORS.
ARTHUR K. WICKSON
HAROLD WATSON
BY
H. Vincent Harsha
ATTORNEY

LOW LOSS SWITCHING CIRCUIT FOR CONTROLLING THE FLOW OF DIRECT CURRENT

INVENTORS.
ARTHUR K. WICKSON
HAROLD WATSON
BY
H. Vincent Harsha
ATTORNEY

United States Patent Office 3,363,164

Patented Jan. 9, 1968

3,363,164

LOW LOSS SWITCHING CIRCUIT FOR CONTROLLING THE FLOW OF DIRECT CURRENT

Harold Watson, Torrance, and Arthur K. Wickson, Palos Verdes Estates, Calif., assignors to The Garrett Corporation, Los Angeles, Calif., a corpora- of California Filed Sept. 10, 1965, Ser. No. 486,343
10 Claims. (Cl. 321—8)

This invention relates in general to switching devices and more particularly to switching devices employing semi-conductor devices. These switching devices will have particular application in inverter circuits though their use is not so limited.

It is an object of this invention to provide a switching device which may be used to control the flow of direct current with a minimum of energy loss in the switch.

It is another object to provide a switching device which will perform the switching function of large power with a minimum disturbance of the voltages and currents external to the switch.

It is still another object of this invention to provide an economical device for interrupting a given value of direct current.

It is yet another object of this invention to provide a switching device having a minimum of component parts of simple construction to interrupt current flow with controlled rate of change of currents and voltages through the aforesaid semi-conductor devices.

It is an object of this invention to provide an economical, low loss switch device which is most useful in inverter circuits employing high power and high switching frequencies.

These and other objects of the invention will be apparent from the following description and claims wherein:

Figure 1:
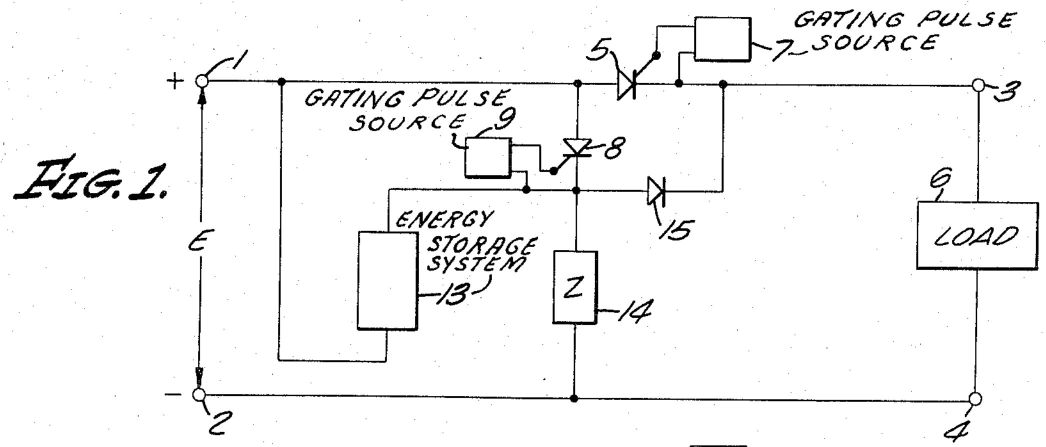
FIG. 1 is a schematic diagram of simplest embodiment of this invention.

In FIG. 1, the input terminals 1 and 2 are connected to a source of D-C voltage of value E. The output terminals 3 and 4 are connected to the load 6. Unilateral conduction device 5 as shown is a silicon controlled rectifier, but may be of any of the other types of well known controlled unidirectional conductors and is hereinafter referred to as SCR. SCR 5 is rendered conductive by the application of a voltage pulse from 7. After application of the pulse, the load 6 is directly connected to the source of energy E through the silicon controlled rectifier 5. This results in the closing of the switch between the source and the load.

The characteristics of silicon controlled rectifiers, thyratrons and other similar devices are such that they can be switched off, or open-circuted, only by the application of a reverse voltage of predetermined value across their anode to cathode terminals for a specified period of time. In FIG. 1 this is accomplished by the concerted actions of SCR 8, a second pulse source 9, an energy storage device or system 13, an impedance 14 and diode 15.

Consider the condition of SCR 5 conducting. Pulse source 9 supplies a voltage or control pulse to the control electrode of SCR 8. This makes SCR 8 switch to a conducting condition. Current flows through SCR 8 to an energy storage system 13. Energy is first absorbed or stored in system 13 for a short period of time and is then returned from system 13. This energy storage system is preferably of low loss nature. The returned energy produces a pulse flow of current through the rectifier or diode 15 to the output terminal 3 and the load 6. The energy storage system 13 provides no direct current path through energy storage system 13 and the pulse of returned current is of greater amplitude than the load current that is being conducted by SCR 5. Thus, when the value of the current through energy storage system 13 rises to the value of the load current, the flow of the load current is transferred from SCR 5 to diode 15 and any further increase of the current through diode 15 produces a reverse voltage across SCR 5. Energy storage system 13 will maintain the returned current through diode 15 at a value greater than the maximum load current for a sufficient time duration to ensure that SCR 5 recovers to its non-conducting condition. In addition to turning off SCR 5, the returned current from the energy storage system 13 produces a reverse voltage across SCR 8 and turns off SCR 8 during the same time period in which SCR 5 is being turned off. The switch is now in an open condition. A small amount of energy continues to flow for a relatively short period of time from energy storage system 13 to the load 6 and through impedance 14 to the input terminal 2. At the completion of this flow of energy, the energy storage system 13 has returned to its original level of energy. The only losses in the system during the complete cycle are the unavoidable resistive losses in the components. The energy losses of the overall switching system are substatnially reduced over any known prior circuits. Impedance 14 may be either a passive or an active inductive circuit to provide a path for the flow of direct current. During the flow of current from energy storage system 13 through diode 15 and impedance 14, the energy level and the polarity of energy of energy storage system 13 is returning towards its initial condition prior to the turning on of SCR 8. At any time after SCR 5 and SCR 8 are turned off (i.e., the complete switch is open), SCR 5 may be turned on again by a pulse from pulse source 7. This timing in an inverter circuit can determine the frequency of the alternating voltage.

If the load 6 is inductive, a rectifier with its cathode connected to terminal 3 and its anode connected to terminal 4 may be added to the invention though not shown in the drawings. This prevents the voltage of terminal 3 from going more negative than terminal 4, when the switch is opened and thus protects the devices SCR 5 and SCR 8 from excessive voltages.

Figure 2:
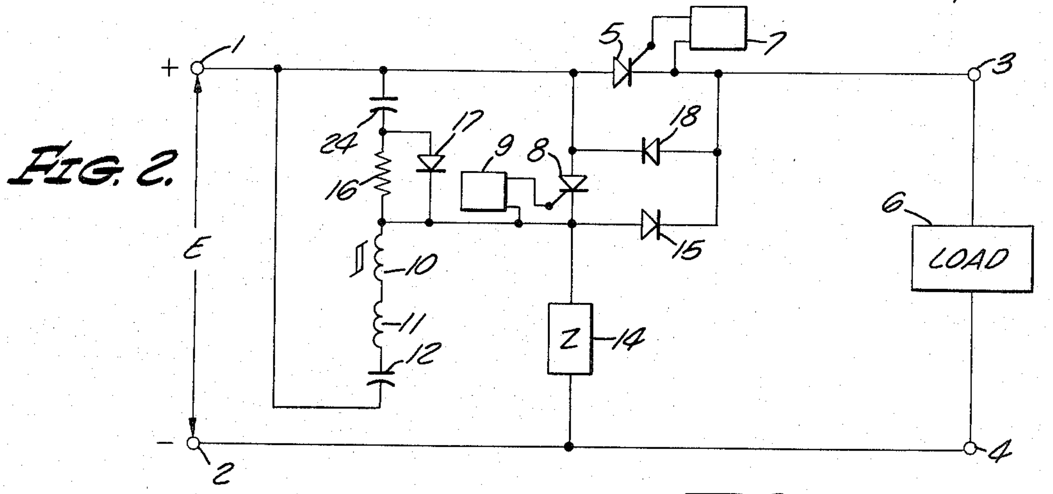
FIGS. 2, 3 and 4 are schematic diagrams of other embodiments of the invention.
Figure 3:
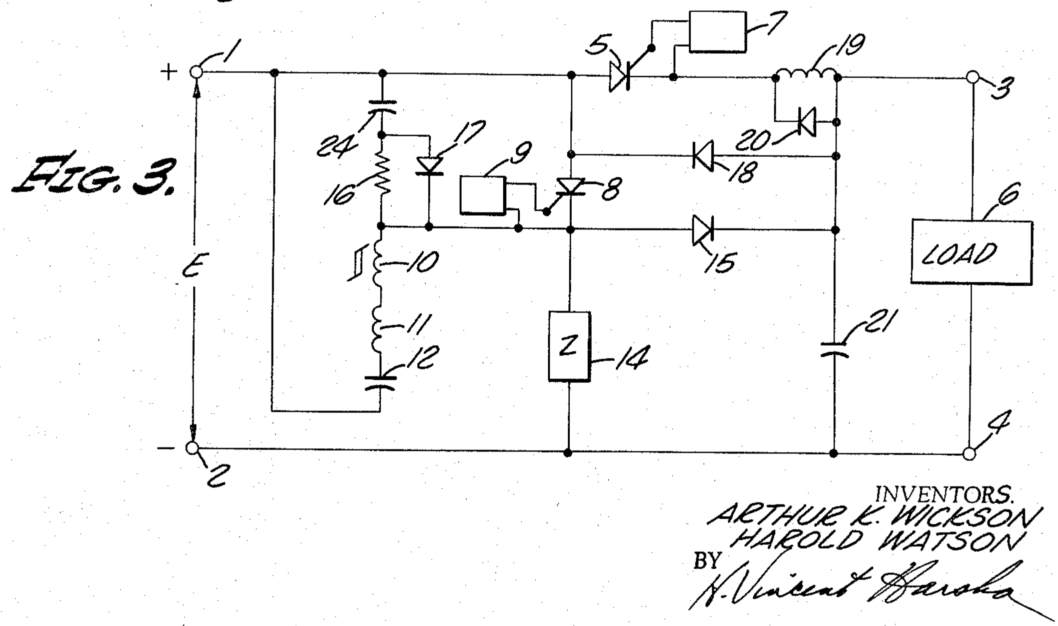
Figure 4:
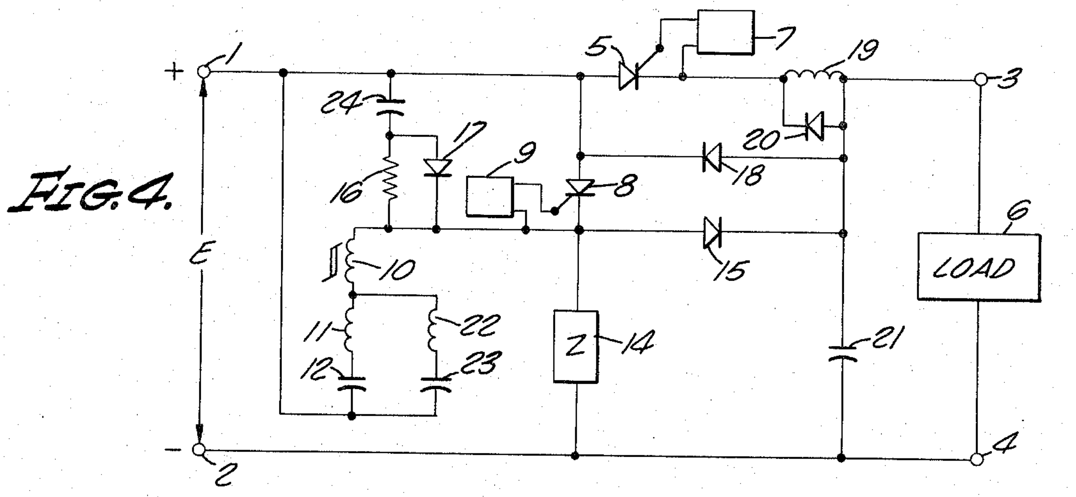

The invention as shown in FIGS. 2–4 achieves improvements in certain aspects of the performance capabilities. For example, the embodiment shown in FIG. 2 provides a more rapid interruption of current to the load when the switch is opened and limits the maximum voltage applied to the load to the value of the source voltage E. This embodiment permits operation at high values of source voltage E by limiting the rate of re-applied voltage to SCR 8.

In this embodiment the energy storage system that was designated 13 in FIG. 1 comprises an inductance 11 and a capacitance 12. The switch operates to turn off the controlled rectifier 5 as follows. A pulse from pulse source 9 switches on the controlled rectifier 8 causing current to flow through a small saturable inductor 10 and through inductance 11 and capacitance 12 back to SCR 8. This current ceases flowing in this direction when the capacitor 12 has changed its potential from approximately −E volts to approximately +E volts. The capacitor 12 now discharges through inductance 11, inductance 10, diode 15 and diode 18 back to the other side of capacitance 12. Diode 18 is a rectifier that provides a constant low impedance path for the return current from the energy storage system comprising inductance 11 and capacitance 12 in FIG. 2 or block 13 in FIG. 1. The addition of diode 18 shortens the period of discharge of energy and hastens the recovery of the system to its initial state. Diode 18 limits the maximum voltage of terminal 3 to +E volts.

Saturable inductor 10, capacitance 24, resistance 16 and diode 17 function in accordance with the following description.

When SCR 8 is turned on, the capacitor 24 is discharged to nearly zero volts through the resistor 16, during the time that current is flowing through saturable inductor 10, inductance 11 nd capacitance 12. The saturable inductor 10 has an unsaturated value of inductance which is considerably greater than the value of the inductance of 11. Also, the inductor 10 saturates at a level of current considerably lower than the maximum value of the charging and discharging current through inductance 11 and capacitance 12.

After the completion of the cycle of current flow into and out of the capacitor 12, the potential of capacitor 12 is approximately —E volts relative to terminal 1 and the potential of the cathode of SCR 8 is approximately zero volts relative to terminal 1. Thus the cathode of SCR 8 tends to drop sharply by E volts applying a sudden application of forward voltage across SCR 8. This rate of application of forward voltage is controllable to predetermined limits by the combined action of capacitance 24, diode 17, saturable inductance 10, and impedance 14. The potential of the cathode of SCR 8 is drawn negative of current flowing from capacitance 24 through diode 17, impedance 14, and input terminals 1 and 2. Impedance 14 may, for example, comprise an inductance in series with a resistance in series with a rectifier. By using suitable values of inductance and resistance in impedance 14, the current flow from capacitance 24 through impedance 14 can be maintained at a desired high level to prevent sufficient current flowing from diode 17 through the energy storage system 13 to saturate inductor 10. This circuit prevents the saturation of saturable inductance 10 in the direction of inductance 11 to capacitance 12 during this period, thus avoiding the cathode potential of SCR 8 being suddenly drawn to a negative value.

The embodiment of the invention shown in FIG. 3 provides some advantages in limiting the differential voltage and current conditions of the main controlled rectifier 5 when the load is variable from a large capacitance to a small inductance and also provides this limiting function when the switch is used in an inverter circuit. An inductor 19, a rectifier 20 and a capacitor 21 are connected to provide this differential limit of current and voltage.

When the load is a large capacitance, the inductor 19 limits the rate of rise of current through SCR 5 each time that SCR 5 is turned on. The rectifier or diode 20 provides a low impedance path for the clearing current through SCR 5 when SCR 5 is turned off. When the load includes a large amount of stored magnetic energy, the potential of terminal 3 and the cathode of SCR 5 will tend to go negative very rapidly. The capacitor 21 controls the rate of change of potential of the cathode of SCR 5 in this situation.

Another embodiment as shown in FIG. 4 includes an inductor 22 in series with a capacitor 23 added across or in parallel with the energy storage circuit. This provides an improvement in the operational characteristics of the turn-off circuit. When SCR 8 is turned on, a pulse of current in the form of a half-sinusoid flows through SCR 8, saturable inductor 10, inductance 11 and capacitance 12. In addition, during the same period, because the resonant frequency of inductance 22 and capacitance 23 is approximately the third harmonic of the resonant frequency of inductance 11 and capacitance 12, approximately 3 half cycles of alternating current of lesser amplitude flow through SCR 8, saturable inductor 10, inductance 22 and capacitance 23. The effect of this superimposed current is to reduce the value of the peak current through SCR 8 and to lengthen the period of time during which the current pulse exceeds a predetermined value.

Figure 5:
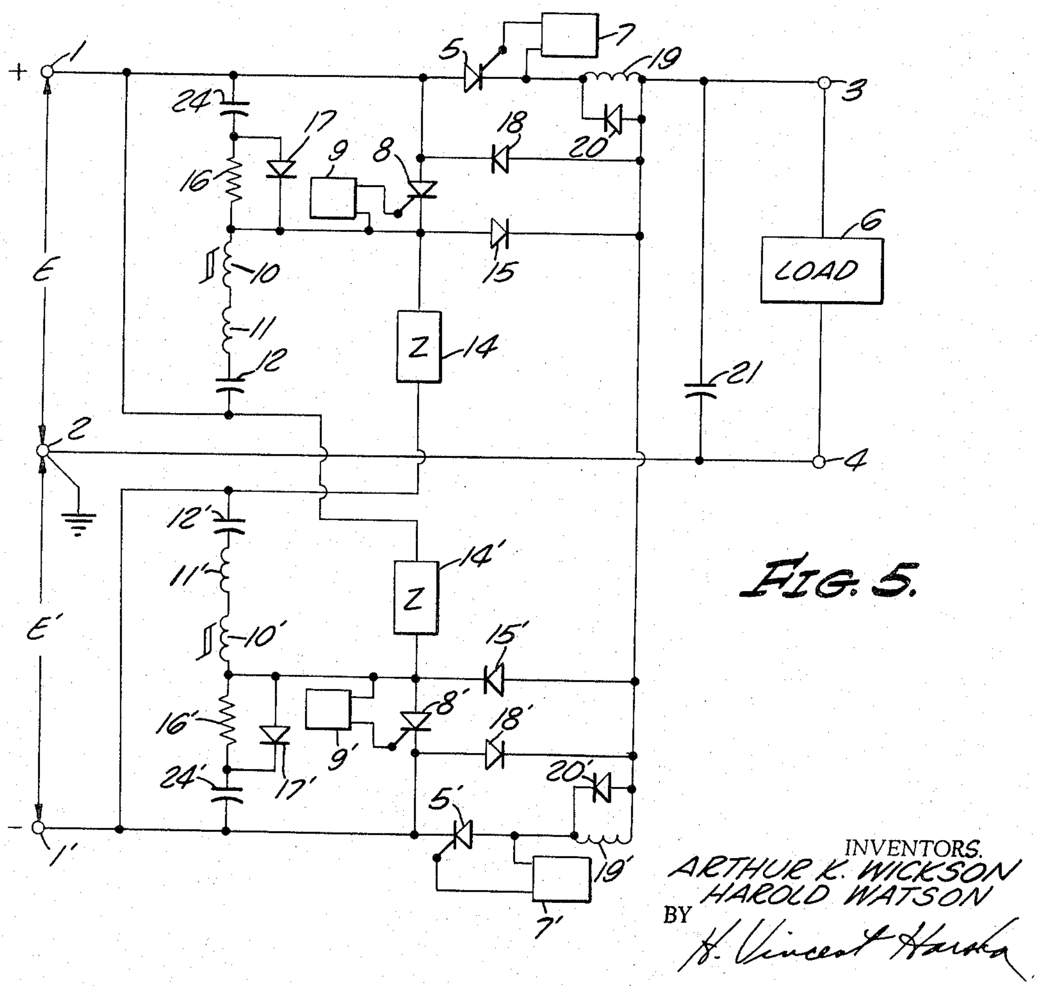
FIG. 5 is a schematic diagram of the invention utilized as a novel inverted circuit.

FIG. 5 comprises two switching circuits each identical to the circuit shown in FIG. 3. One of these switching circuits is connected between a power source of positive voltage, relative to ground, and the load. The other circuit is connected between a power source of negative voltage, relative to ground, and the same load. One terminal of the load is connected to the common ground terminal of the two power sources. This combination comprises an inverter circuit that can produce an alternating current in the load 6.

A positive voltage is produced across the load 6 after 5′ is switched off and 5 is switched on. When 5 is switched off the voltage across 3 to 4 tends to zero volts. Then 5′ is switched on and a negative voltage is produced across the terminals 3 to 4. The circuit starts from a zero condition of currents and voltages and when SCR 5 is switched on by a voltage from source 7, a positive voltage is produced across the load 6.

When SCR 5 is turned off by the circuit as described above in the description of FIG. 3, energy will cease flowing to the load in the positive direction. Upon completion of the opening of the switch, including SCR 5 and SCR 8, a control voltage may subsequently be applied to SCR 5′. When SCR 5′ is switched on, a negative voltage is produced across load 6. The switching action will sequentially open SCR 5′ and SCR 8′ in a manner similar to that described for SCR 5 and SCR 8.

The alternating action described for SCR 5 and SCR 8, and SCR 5′ and SCR 8′, produces an alternating voltage across the load 6. An inverter built utilizing the switch circuits of this invention is capable of higher frequencies than known inverters and operates at higher efficiencies at all frequencies.

We claim:

1. A switch comprising:
first and second input terminals;
first and second output terminals;
a first means including a cathode, an anode and a control electrode for providing unilateral conduction upon the application of a predetermined control voltage to said control electrode, said first means maintaining itself in said conductive state until positively interrupted, said first means connected between said first input terminal and said first output terminal;
a second means including a cathode, an anode and a control electrode for providing unilateral conduction upon the application of a predetermined control voltage to its control electrode, said second means maintaining itself in a conductive state until said conductive state is positively interrupted, said anode connected to said first input terminal and anode of said first means;
means for providing pulses of said predetermined control voltages connected to said control electrodes;
a unilateral conduction device connected to said first output terminal and said second means;
an energy storage means, said energy storage means having one end connected to said first input terminal and the other end connected to said second means and said unilateral conduction device;
impedance means having one end connected to said unilateral conduction device, said second means and said energy storage device and the other end connected to said second input terminal.

2. A switch according to claim 1 in which said energy storage device comprises an inductance and a capacitance connected in series.

3. A switch comprising:
first and second input terminals;
first and second output terminals;
a first means including a cathode, an anode and a control electrode for providing unilateral conduction upon the application of a predetermined control voltage to said control electrode, said first means maintaining itself in said conductive state until positively interrupted, said first means connected between said first input terminal and said first output terminal;
a second means including a cathode, an anode and a control electrode for providing unilateral conduction upon the application of a predetermined control voltage to its control electrode, said second means maintaining itself in a conductive state until said conductive state is positively interrupted, said anode connected to said first input terminal and anode of said first means;
a capacitive network having a finite time constant in one direction and substantially zero time constant in the other direction, connected across said second means;
means for providing pulses of said predetermined control voltages connected to said control electrodes;
a unilateral conduction device connected to said first output terminal and said second means;
an energy storage means, said energy storage means having one end connected to said first input terminal and the other end connected to said secod means and said uilateral conduction device;
impedance means having one end connected to said unilateral conduction device, said second means and said energy storage device and the other end connected to said second input terminal.

4. A switch comprising:
first and second input terminals;
first and second output terminals;
a first means including a cathode, an anode and a control electrode for providing unilateral conduction upon the application of a predetermined control voltage to said control electrode, said first means maintaining itself in said conductive state until positively interrupted, said first means connected between said first input terminal and said first output terminal;
a unilateral conduction device connected in opposite polarity across said first means;
a second means including a cathode, an anode and a control electrode for providing unilateral conduction upon the application of a predetermined control voltage to its control electrode, said second means maintaining itself in a conductive state until said conductive state is positively interrupted, said anode connected to said first input terminal and anode of said first means;
a capacitive network having a finite time constant in one direction and substantially zero time constant in the other direction, connected across said second means;
means for providing pulses of said predetermined control voltages connected to said control electrodes;
a unilateral conduction device connected to said first output terminal and said second means;
an energy storage means, said energy storage means comprising an inductance and capacitance connected in series and having one end connected to said first input terminal and the other end connected to said second means and said unilateral conduction device;
impedance means having one end connected to said unilateral conduction device, said second means and said energy storage device and the other end connected to said second input terminal.

5. A switch comprising:
first and second input terminals;
first and second output terminals;
a first means including a cathode, an anode and a control electrode for providing unilateral conduction upon the application of a predetermined control voltage to said control electrode, said first means maintaining itself in said conductive state until positively interrupted, said first means connected between said first input terminal and said first output terminal;
a unilateral conduction device connected in opposite polarity across said first means;
a second means including a cathode, an anode and a control electrode for providing unilateral conduction upon the application of a predetermined control voltage to its control electrode, said second means maintaining itself in a conductive state until said conductive state is positively interrupted, said anode connected to said first input terminal and anode of said first means;
means for controlling the rate of current change and the rate of voltage change in said second means;
a capacitive network having a finite time constant in one direction and substantially zero time constant in the other direction, connected across said second means;
means for providing pulses of said predetermined control voltages connected to said control electrodes;
a unilateral conduction device connected to said first output terminal and said second means;
an energy storage means, said energy storage means comprising an inductance and a capacitance connected in series and having one end connected to said first input terminal and the other end connected to said second means and said unilateral conduction device;
impedance means having one end connected to said unilateral conduction device, said second means and said energy storage device and the other end connected to said second input terminal.

6. A switch comprising:
first and second input terminals;
first and second output terminals;
a first means including a cathode, an anode and a control electrode for providing unilateral conduction upon the application of a predetermined control voltage to said control electrode, said first means maintaining itself in said conductive state until positively interrupted, said first means connected between said first input terminal and said first output terminal;
a first unilateral conduction device connected in opposite polarity across said first means;
a second means including a cathode, an anode and a control electrode for providing unilateral conduction upon the application of a predetermined control voltage to its control electrode, said second means maintaining itself in a conductive state until said conductive state is positively interrupted, said anode connected to said first input terminal and anode of said first means;
a capacitive network having a finite time constant in one direction, and substantially zero time constant in the other direction, connected across said second means;
means for providing pulses of said predetermined control voltages connected to said control electrodes;
a second unilateral conduction device connected to said first output terminal and said second means;
an energy storage means, said energy storage means comprising an inductance and a first capacitance connected in series and having one end connected to said first iput terminal and the other end connected to said second means and said unilateral conduction device;
means for controlling the rate of current change and the rate of voltage change in said second means, wherein said means comprises a saturable inductance connected between said energy storage device and said second means, and said capacitive network including a capacitance, a diode and resistance; and
impedance means having one end connected to said second unilateral production device, said second means and said energy storage device and the other end connected to said second input terminal.

7. A switch comprising:
first and second input terminals;
first and second output terminals;

a first means including a cathode, an anode and a control electrode for providing unilaterial conduction upon the application of a predetermined control voltage to said control electrode, said first means maintaining itself in said conductive state until positively interrupted, said first means connected between said first input terminal and said first output terminal;

a first unilateral conduction device connected in opposite polarity across said first means;

a second means including a cathode, an anode and a control electrode for providing unilateral conduction upon the application of a predetermined control voltage to its control electrode, said second means maintaining itself in a conductive state until said conductive state is positively interrupted, said anode connected to said first input terminal and anode of said first means;

a capacitive network having a finite time constant in one direction and substantially zero time constant in the other direction, connected across said second means;

a saturable inductance connected in series with said capacitive network and said second means;

means for providing pulses of said predetermined control voltages connected to said control electrodes;

a second unilateral conduction device connected to said first output terminal and said second means;

an energy storage means, said energy storage means comprising an inductance and a first capacitance connected in series and having one end connected to said first input terminal and the other end connected to said second means and said unilateral conduction device, through said saturable inductance;

means for controlling the rate of current change and the rate of voltage change in said second means, said means including said saturable inductance and said capacitive network which includes a second capacitance, connected in series with a parallelly connected diode and resistance;

impedance means having one end connected to said second unilateral conduction device, and said second means and the other end connected to said second input terminal.

8. A switch comprising:

first and second input terminals;

first and second output terminals;

a first capacitance connected between said first and second output terminals;

a first means including a cathode, an anode and a control electrode for providing unilateral conduction upon the application of a predetermined control voltage to said control electrode, said first means maintaining itself in said conductive state until positively interrupted, said first means connected between said first input terminal and said first output terminal;

a first unilateral conduction device connected in opposite polarity across said first means;

an inductive network connected between said first means and said first output terminal;

a second means including a cathode, an anode and a control electrode for providing unilateral conduction upon the application of a predetermined control voltage to its control electrode, said second means maintaining itself in a conductive state until said conductive state is positively interrupted, said anode connected to said first input terminal and anode of said first means;

means for controlling the rate of current change and the rate of voltage change in said second means;

means for providing pulses of said predetermined control voltages connected to said control electrodes;

a second unilateral conduction device connected to said first output terminal and said second means;

an energy storage means, said energy storage means comprising an inductance and a second capacitance and having one end connected to said first input terminal and the other end connected to said second means and said unilateral conduction device, through said means for controlling the rate of current change;

said means for controlling the rate of current change comprising a saturable inductance connected between said energy storage means and said second means; and a network including a third capacitance, and a diode and resistance connected in parallel; said third capacitance connected in series with said parallel connected resistance and diode; said network being connected across said second means and having a finite time constant in one direction and substantially zero time constant in the other direction;

and impedance means having one end connected to said second unilateral conduction device, said second means and said saturable inductance and the other end connected to said second input terminal.

9. A switch comprising:

first and second input terminals;

first and second output terminals;

a first capacitance connected between said first and second output terminals;

a first means including a cathode, an anode and a control electrode for providing unilateral conduction upon the application of a predetermined control voltage to said control electrode, said first means maintaining itself in said conductive state until positively interrupted, said first means connected between said first input terminal and said first output terminal;

an inductive network connected between said first means and said first output terminal;

a second means including a cathode, an anode and a control electrode for providing unilateral conduction upon the application of a predetermined control voltage to its control electrode, said second means maintaining itself in a conductive state until said conductive state is positively interrupted, said anode connected to said first input terminal and anode of said first means;

a first unilateral conduction device connected in opposite polarity across said first means;

control means for controlling the rate of current change and the rate of voltage change in said second means;

means for providing pulses of said predetermined control voltages connected to said control electrodes;

a second unilateral conduction device connected to said first output terminal and said second means;

an energy storage means, said energy storage means comprising a first inductance and a second capacitance and having one end connected to said first input terminal and the other end connected to said control means;

said control means comprising a saturable inductance connected between said energy storage means and said second means; and a capacitive network including a third capacitance, and a diode and resistance connected in parallel; said third capacitance connected in series with the parallel connected resistance and diode; said network connected across said second means and having a finite time constant in one direction and substantially zero time constant in the other direction;

a second inductance and a fourth capacitance in series connected across said energy storage means where said energy storage means has a resonant frequency, said second inductance and fourth capacitance having resonant frequency approximating an odd multiple of the resonant frequency of said energy storage device;

and impedance means having one end connected to said second unilateral conduction device, said second means and the other end connected to said second input terminal.

10. An inverter comprising:

a source of direct current potential;

first and second output terminals;

a first switch means including first means and second means each having a cathode and anode and a control electrode for providing unilateral conduction upon the application of predetermined control signal to said control electrode to each of said means maintaining itself in a conductive state until positively interrupted;

means for providing control signals to each of said control electrodes for said first switch means;

said first means connected to a first side of said source of potential;

a first inductive network connected to said first means and said first output terminal;

said second means connected to said first side of said source of potential;

a first impedance connected to said second means and the second side of said source of potential;

a first energy storage system connected to said second means and said first side of said source of direct current potential;

a first capacitive network connected across said second means;

a first unilateral conductive device connected across said first means;

a second unilateral conductive device connected to said first output terminal and said second means;

a first saturable inductor connected to said second means and said first energy storage system;

a second switch means including a first means and a second means each having a cathode, an anode and a control electrode for providing unilateral conduction upon the application of a predetermined control voltage to said control electrode, said means maintaining itself in a conductive state until positively interrupted;

means for providing control signals to each of said control electrodes for said second switch means;

said first means of said second switch means connected to the second side of said source of direct current potential;

a second inductive network connected to said first means and said first output terminal;

said second means of said second switch means connected to said second side of said source of potential;

a second impedance connected to said second means of said second switch means and the first side of said source of potential;

a second energy storage system connected to said second means of said second switch means and said second side of said source of potential;

a second capacitive network connected across said second means of said second switch means;

a third unilateral conductive device connected across said first means of said second switch means;

a fourth unilateral conductive device connected to said first output terminal and said second means of said second switch means;

a second saturable inductor connected to said second means of said second switch means and said second energy storage system;

the first impedance of first switch means connected to the second energy storage system of said second switch means;

the second impedance of said second switch means connected to the first energy storage system of said first switch means;

a capacitance connected across said output terminals; and said second output terminal connected to a mid-potential of said source of direct current potential.

References Cited

UNITED STATES PATENTS

| | | | |
|---|---|---|---|
| 3,174,096 | 3/1965 | Lichowsky | 323—22 |
| 3,192,468 | 6/1965 | Buchanan et al. | 323—22 |
| 3,229,191 | 1/1966 | Williamson | 321—45 |
| 3,263,153 | 7/1966 | Lawn | 321—45 |
| 3,286,155 | 11/1966 | Corey | 321—45 |
| 3,303,407 | 2/1967 | Depenbrock et al. | 321—45 |

JOHN F. COUCH, *Primary Examiner.*

W. M. SHOOP, JR., *Assistant Examiner.*